June 28, 1960  A. C. SAUNDERS  2,943,008
REFRACTORY ARTICLES
Filed July 17, 1956
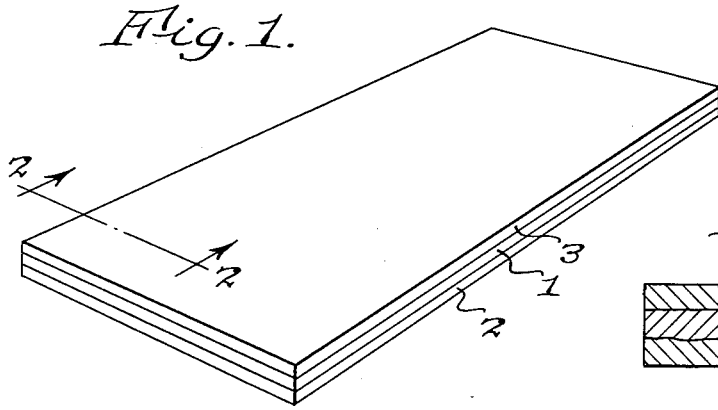
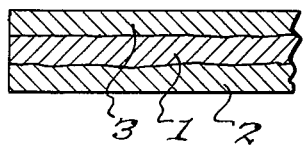
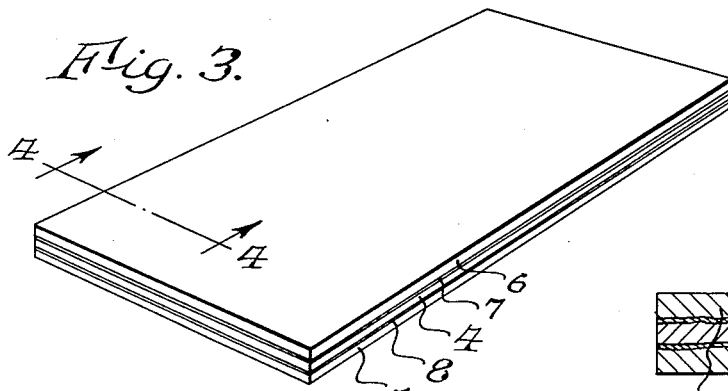
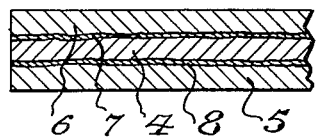
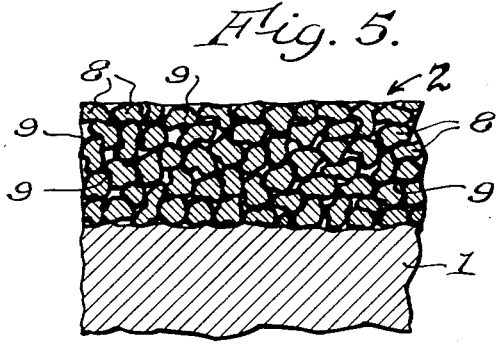
INVENTOR.
Alfred C. Saunders
BY
Parker & Pridmore
Attorneys.

United States Patent Office 2,943,008
Patented June 28, 1960

2,943,008
REFRACTORY ARTICLES
Alfred C. Saunders, Hamburg, N.Y., assignor to Electro Refractories & Abrasives Corporation, Buffalo, N.Y.
Filed July 17, 1956, Ser. No. 598,455
6 Claims. (Cl. 154—43)

This invention relates to improvements in batts or slabs for the supporting of ceramic ware in kilns during firing to vitrify the material, and to other refractory articles as will be hereinafter disclosed. This application constitutes a continuation-in-part of my copending application Serial No. 359,685, filed June 5, 1953, now abandoned.

In the past such batts have been made of various refractory materials such as fireclay, silicon carbide, alumina, etc., each of which has certain merits and certain short-comings. It is the purpose of my invention to overcome the latter without sacrificing the former. In general, silicon carbide batts have been used where it is necessary to carry substantial loads to temperatures above perhaps 2300° F. or where the heat shock has been so severe as to result in cracking batts of the other materials. The other materials have on the other hand been somewhat more stable chemically than silicon carbide in the presence of strongly oxidizing atmospheres where the silicon carbide batts tend to grow and weaken resulting in short useful life in service. These materials, however, are all inherently weak in supporting transverse loads at high temperatures to such an extent that their use is commercially impractical at the higher temperatures.

Silicon carbide batts have also exhibited objectionable staining characteristics when used to support certain white ceramic wares with which the batt reacts, causing serious lossts due to rejection of the discolored ware. This has not been solely a matter of appearance but at times also involves changes in the electrical properties of the ware being fired, insulators for example, which changes spoil the technical utility of the articles.

Another trouble frequently arises in the manufacture of so-called single fire glazed ceramic ware where it is found that after silicon carbide batts have started to deteriorate in service, they become softer and permit small particles of silicon carbide to fall from the underside of the batt above onto the ware being fired beneath.

In order to obviate these various troubles, numerous attempts have been made to paint the surface of the silicon carbide with other materials.

These painted coatings have been of two general types: (1) a combination of refractory materials selected to provide a stain-free non-sticking surface which permits firing the ware directly in contact with the batt, or (2) a combination of materials which will fuse over to form a glaze on the surface of the batt and thus forestall chemical reaction of the atmosphere or the load with the supporting batt.

These coatings, however, introduce new disadvantages of their own. In the first type, it is necessary to build up a relatively heavy layer of paint to prevent the sticking or staining from occurring. Because of the difficulty of making such a heavy coating adhere, it is necessary to apply the coating many times in thin layers, firing each layer on before applying the next one. Even then it is quite normal for such coatings to peel off in spots or areas, necessitating continual applications of new paint. This type of coating moreover tends to absorb vapors from the glaze on the ceramic ware which then react with it, causing it to either loss its adherence and "flake off," falling on the ware, or to flux down to form a glass which tends to drip onto the ware beneath.

The second or fused-over type of coating, if applied to both sides of a batt, seriously increase the "sticking" or "staining" condition on the setting surface, thus making this solution of the problem completely impractical. If the fused-over coating is applied to the undersurface only, it reduces the tendency of the silicon carbide to come loose and fall on the ware but it tends to create a differential rate of oxidation between the two batt surfaces, leading to differential growth which causes the batt to warp or otherwise distort so that a flat setting surface is no longer available and the batt must often be discarded prematurely.

Difficulties have been particularly encountered in supporting some of the new electrical ceramic materials such as steatites, titanates and ferrites which have recently come into large demand for the electronics industry. The chemical nature of these is such that serious reaction occurs between the body being fired and the silicon carbide or the ceramic bond in the batt. On the other hand, the firing temperatures required for the new materials are so high that none of the other materials used to make batts is sufficiently strong.

Some of the producers of these electrical materials have therefore gone to the use of silicon carbide batts to carry the load with other batts resting thereon to support the ware. This is of course costly, since it involves twice as many batts, and is wasteful of space and of fuel due to the greater space occupied in the kiln by the double batts and the greater weight of material which thus requires heating. It has been found moreover that there is a serious tendency of the ware-carrying pieces to crack in service unless they are kept rather small, which involves extra handling each time they are used.

I have found it possible to overcome all of these objections and greatly increase the efficiency of the firing process and to prolong the life of silicon carbide batts by making batts of a sandwich type embodying in one piece a silicon carbide center layer, which imparts strength and prevents cracking, and one or more (preferably two opposite) facings of non-reactive refractory material of substantial thickness which are molded integrally with the silicon carbide center portion and fired simultaneously therewith. In conjunction with these facings, I incorporate (as will be brought out below) oxidation inhibiting materials which protect the silicon carbide and prolong its life.

In my new type of batts, I may make the outer facings of chemically neutral oxidic refractory material such as alumina, mullite (or other aluminum silicate higher than 50% by weight of alumina), zircon, forsterite, chromite or the like. For pieces which are required to carry a load of strongly alkaline character, I may make the facings of prefused or dead burned magnesite, suitably bonded, although with facings of this type I prefer to interpose a thin parting layer of chromite between the silicon carbide and the magnesia to prevent undesired chemical reaction between these two materials.

In the accompanying drawings:

Figure 1 is a perspective view of a batt made with silicon carbide center layer and two oxidic facings thereon.

Fig. 2 is a fragmentary section thereof on an enlarged scale on line 2—2, Fig. 1.

Fig. 3 is a perspective view of a batt made with a silicon carbide center layer, two magnesia facings, and parting layers between the silicon carbide and the magnesia.

Fig. 4 is a fragmentary section thereof, on an enlarged scale, on line 4—4, Figure 3.

Fig. 5 is an enlarged schematic illustration partly in section, showing in more detail the disposition of glassy material within layer 2 of Fig. 2.

In Figs. 1, 2 and 5, 1 represents a central layer of bonded grains of silicon carbide, 2 and 3 are facing layers of oxidic refractory. Layer 1 is the strength-giving portion of the batt and should be from ⅓ to ⅞ of the thickness of the entire batt. Layers 2 and 3 should preferably be of equal thickness with one another with each at least 1/16 inch thick. ⅛ inch is usually a more satisfactory thickness for layers 2 and 3. Each of these various layers should be of approximately equal thickness throughout its extent, although minor variations are common and are not fatal. At the edges of the batt, it will be found that there is a characteristic tendency of the line of division between layers to shift toward one of the broad faces due to sticking of the mix to the side of the mold during pressing to size. This does not extend far in away from the edge, however and causes no major harm.

In Figs. 3 and 4, 4 represents the central layer of silicon carbide, 5 and 6 the facing layers of bonded magnesite and 7 and 8 are thin layers of chromite interposed between the silicon carbide and the magnesite to prevent chemical interaction between the two. The relative thicknesses of layers 4, 5 and 6 are similar to those of layers 1, 2 and 3 described above, while layers 7 and 8 may be relatively thin, perhaps 1/16 inch each or even less.

In Fig. 5, one corner of layer 2 of Fig. 2 is schematically indicated in section in microscopic detail to illustrate particles of oxidic refractory material 8 with the pores between them containing a fusible glassy silicate 9 which partially fills them, thus sealing the passages through them and serving to inhibit the access of oxidizing gases thru these passages to the silicon carbide of layer 1.

As noted above, I find it advantageous to incorporate in my type batts fusible glassy ingredients in the pores of the oxidic portions thereof which prevent ready access of air to the silicon carbide, thus retarding the destructive oxidation thereof, and I prefer to incorporate these ingredients within the pores of the oxidic portion of the batt in such amounts that they do not completely fill the pores therein. In this way the fusible portion does not reach the surface in large enough amounts to react with or adhere to ware set thereon but is rather retained within the pores of the refractory by capillary action.

It is however carried by the capillaries to and even beyond the interface with the silicon carbide layer where it is able to help cement the oxidic face to the silicon carbide center of the batt with a degree of flexibility which is very helpful in holding the batt together when the coefficients of expansion of the various layers differ. The glassy material also provides a reservoir of flux next to the silicon carbide which is capable of dissolving silica formed by oxidation and so retards disruption of the piece by increase in volume of the silica. In this same way it prevents the blotting away from the silicon carbide portion of the glassy ingredients already present therein as a bond and so prolongs its life.

In addition to the glass thus placed in the pores of the oxidic portion of the batt, oxidation inhibiting material may also be incorporated in the silicon carbide portion of my mix provided care is taken to keep the amount below that which might impair the refractoriness of the body, or I may apply it initially locally as a thin layer immediately at the interface between the carbide and oxidic layers. In general however I prefer to incorporate it as an ingredient throughout and partially filling the pores within the oxidic layer. In that position its fluxing tendencies do not weaken the silicon carbide portion of the batt on which I rely for its strength, nor do they set up a zone where slippage tends to occur. On the other hand their presence "in depth" in the oxidic layer, seems to be very effective in keeping the oxidizing gases from reaching and destroying the silicon carbide layer while they also seal together the oxidic layer, healing any minor cracks which might otherwise permit granules of it to crumble away and binding the oxidic layer firmly to the carbide layer.

I find it desirable to vary the composition of my oxidation inhibitor somewhat depending upon the conditions under which the batts are to be used although in all cases a glassy silicate seems desirable. For low temperature use (up to perhaps 2300° F.), a simple sodium silicate such as Philadelphia Quartz Co's. grade N (containing 8.9% $Na_2O$:28.7% $SiO_2$) may be used, adding it to the oxidic mix in amounts from 3 to 10% by weight. I prefer to add the flux as a precombined silicate or at least in the form of low solubility materials as I find that otherwise highly soluble materials migrate to the surface and concentrate in the wrong part of the batt. Silicates of the other alkalies besides sodium may obviously be substituted.

For somewhat higher temperatures (from perhaps 2200° F. to 3000° F.) I may substitute alkaline earths for the alkalies. Here again low solubility forms of alkaline earths should be selected. Compounds of Sr and Ca seem to work best. Finely powdered calcium sulfate may for example be used. Or Whiting combined with clays may be used as in an example below. From 0.2 to 1.0% by weight of a soluble alkaline earth ion may however be added in a more soluble form such as a chloride salt. In this case the glassy silicate is formed by reaction of the alkaline earth with other ingredients in the mixture. These alkaline earth glasses yield adequate protection at the higher temperatures without reacting excessively with the body as the alkali silicates sometimes do.

Where the oxidic facing is composed of non-porous crystalline grog material less of the fusible glass is required than when the grog is absorbent in character.

Suitable fusible glassy silicates can be formed in situ in the body by adding to the oxidic mix from 3 to 15% by weight of such mixtures as the following.

Percent by weight
(a) Sodium boro-alumino-silicate:
Potters flint, 325 mesh _____ 10
Feldspar, 325 mesh _____ 25
Prefused borax, 325 mesh _____ 25
Albany slip clay _____ 40

(b) Soda-lime-alumina silicate glass:
Potters flint _____ 25
Feldspar _____ 45
Whiting _____ 20
Georgia kaolin _____ 10

If it is desired to apply a relatively heavy coat of oxidation preventive material between layers, one of the two latter mixtures can for example be sprayed or sifted onto the interface while the batt is being assembled in the mold in which it is formed. This is drawn by capillary attraction into the pores on either side of the interface but it is particularly important that it be drawn into the pores on the oxidic side.

While I may make my batts by a so-called flat ramming process, I prefer to press them using forming pressures of ½ ton per square inch or more. In making batts in accordance with Figure 1, I first deposit a layer of oxidic refractory 2 on the bottom of a mold and smooth it roughly flat with a suitable scraper without closely compacting it. Then I apply a layer 1 of silicon carbide mix, taking care not to disturb underlying layer 2, and level off layer 1 in turn, after which layer 3 of oxidic refractory is added carefully and smoothed down. When five layers are required as in Figures 3 and 4, similar procedures are followed using suitable depths of raw material in the various cases. Finally, in either case the assembled layers in he mold are pressed tightly together in the manner familiar in the ceramic art, reducing the entire batt to the desired thickness. It is then removed from the mold, carefully dried and subsequently fired in the manner usual to silicon carbide refractories, usually while supported on edge with ample air circulation around it.

The temperature of firing will vary somewhat with the material being burned although with the materials which I shall hereinafter disclose firing to cone 15 in a period of 30 hours up and another 36 hours down will be found adequate.

I have used the expression oxidic refractory throughout this specification. Under this term I include not merely combinations of refractory oxides, silicates, etc., but combinations of these materials with up to equal parts by weight of silicon carbide granules. I also include magnesia mixtures, etc., bonded with chlorides or fluorides of metals which convert to oxides during the firing process.

The silicon carbide portion of my batts may be of either the clay bonded or the so-called "self-bonded" type, both well known to the art. Tests have shown that in batts made in accordance with my invention the useful service life of the batt is prolonged as much as 300% in comparison with silicon carbide batts of the usual types and yet sticking and dripping are completely avoided.

For purposes of illustration but not limitation, I give the following useful mixtures for the various portions of my batts (aside from oxidation inhibitors added as noted above).

Parts by weight

Silicon carbide layer mixes:
  A. 12 mesh and finer SiC _____ 90
     Maryland ball clay _____ 10
     Cellulose sulfite pitch _____ 3
  B. 12 mesh and finer SiC _____ 90
     200 and finer SiC _____ 10
     Cellulose sulfite pitch _____ 4

Oxidic layer mixes:
  C. Calcined kyanite, 20 and finer _____ 75
     Raw kyanite, 100 and finer _____ 5
     Georgia kaolin _____ 20
     Dextrine _____ 1
  D. Granular aluminum oxide, 14 and finer _____ 75
     Fine aluminum oxide _____ 15
     Georgia kaolin _____ 10
  E. Zircon, granular _____ 80
     Zircon, ball milled _____ 20
     Dextrine _____ 1
  F. Electrically fused MgO, 14 and finer _____ 95
     35% by weight MgCl solution _____ 5
  G. 12 and finer SiC _____ 65
     100 and finer granular zircon _____ 15
     —325 mesh ball milled zircon _____ 20
     —325 mesh magnesium carbonate _____ 1

Parting layer mix:
  40 and finer chromite ore (40% $Cr_2O_3$) _____ 90
  Kentucky ball clay _____ 10

While it is desirable that the firing shrinkage of the various layers should be closely alike and that their coefficients of thermal expansion should coincide (which can be approximated by proper selection of bonds), I find that with facing layers of equal thickness on opposite sides of the silicon carbide layer, then the batts can be made and used over long periods of time without warpage or the shelling off of the faces even though the coefficients of expansion of the two portions are not entirely equal to one another.

This absence of shelling off I attribute largely to the presence in the oxidic layers of my glassy silicate inhibitors of oxidation which seem to soften sufficiently to hold the materials firmly together despite localized disrupting forces.

While I have described my invention as applied to batts for the firing of ceramic ware, the same principles can be utilized to advantage in forming saggers for firing such ware, in which a strengthening layer of silicon carbide in the body of the sagger is integrally enclosed by a protective oxidic layer. Also my invention is applicable to the formation of refractory hearth blocks or other pieces in which the heat conductivity or strength of silicon carbide make its use beneficial as a refractory and in which the presence of oxidic facings with my glassy silicate therein prolongs the life of the refractory and/or reduces trouble from contact with such materials as mill scale which react too freely with silicon carbide but little or not at all with proper oxidic facings.

Having disclosed the underlying principles of my invention, together with a wide range of refractory mixtures wherewith its advantages can be achieved, and suitable methods of assembling, forming and firing articles made in accordance therewith, what I claim is:

1. A refractory article consisting of a silicon carbide layer and a facing layer integral therewith, said facing layer being composed of refractory material selected from the group consisting of alumina, zircon, aluminum silicate containing over 50% $Al_2O_3$ by weight, and mixtures thereof with up to equal parts by weight of SiC, said facing layer including also therein, in an amount from 1% up to 10% by weight of the said facing layer, a silicate glass containing an oxide selected from the group consisting of the oxides of alkali and alkaline earth metals and of boron and mixtures thereof.

2. A refractory article in accordance with claim 1, in which the facing layer is composed of aluminum silicate containing in excess of 50% $Al_2O_3$ by weight and in which the silicate glass is an alkali aluminum silicate.

3. A refractory article in accordance with claim 1, in which the facing layer is composed of zircon and in which the silicate glass is an alkali aluminum silicate.

4. A refractory article in accordance with claim 1 in which the silicate glass is contained principally in the pores of the facing layer and terminates mainly short of the exterior ends thereof while extending through said layer into contact with the silicon carbide layer.

5. A refractory article consisting of a central silicon carbide layer and facing layers integral therewith on opposite faces thereof composed of refractory material selected from the group consisting of alumina, zircon, aluminum silicate containing over 50% $Al_2O_3$ by weight and mixtures thereof with up to equal parts by weight of SiC, said facing layers containing in the pores thereof an alkali silicate glass in an amount from 1 to 10% by weight of the said facing layers which partially fills the pores thereof to retard passage of oxidizing gas through said pores to the central silicon carbide layer.

6. A refractory article consisting of a central silicon carbide layer and facing layers on opposite sides thereof composed of refractory material selected from the group consisting of alumina, zircon, aluminum silicate containing over 50% $Al_2O_3$ by weight and mixtures thereof with up to equal parts by weight of SiC, and a bond between said silicon carbide layer and the facing layers partly in the pores of each layer, said bond being formed on an alkali silicate glass.

References Cited in the file of this patent

UNITED STATES PATENTS

| | | |
|---|---|---|
| 1,345,377 | Linbarger | July 6, 1920 |
| 1,653,918 | Martin | Dec. 27, 1927 |
| 1,818,904 | Martin | Aug. 11, 1931 |
| 2,118,789 | Fisher | May 24, 1938 |
| 2,364,108 | Swentzel | Dec. 5, 1944 |
| 2,388,080 | Riddle | Oct. 30, 1945 |
| 2,524,601 | Riddle | Oct. 3, 1950 |
| 2,559,343 | Caton | July 3, 1951 |
| 2,609,318 | Swentzel | Sept. 2, 1952 |